US008281080B2

(12) United States Patent
Godin et al.

(10) Patent No.: US 8,281,080 B2
(45) Date of Patent: Oct. 2, 2012

(54) METHOD AND APPARATUS FOR MODIFYING AN INFORMATION UNIT USING AN ATOMIC OPERATION

(75) Inventors: Kostantin Godin, Herzlia (IL); Moshe Anschel, Kfar-Saba (IL); Uri Dayan, Herzelia (IL); Dvir Rune R Peleg, Tel-Aviv (IL)

(73) Assignee: Freescale Semiconductor, Inc., Austin, TX (US)

(*) Notice: Subject to any disclaimer, the term of this patent is extended or adjusted under 35 U.S.C. 154(b) by 35 days.

(21) Appl. No.: 10/933,191

(22) Filed: Sep. 2, 2004

(65) Prior Publication Data

US 2006/0047917 A1    Mar. 2, 2006

(51) Int. Cl.
G06F 12/00 (2006.01)
G06F 13/00 (2006.01)
G06F 13/28 (2006.01)

(52) U.S. Cl. .................................. 711/146; 711/152

(58) Field of Classification Search .................. 711/146, 711/147, 151, 152, 153, 156; 709/214, 216; 710/107, 108, 200
See application file for complete search history.

(56) References Cited

U.S. PATENT DOCUMENTS

| | | | |
|---|---|---|---|
| 5,276,847 A | 1/1994 | Kohn | |
| 5,428,761 A | 6/1995 | Herlihy et al. | |
| 5,548,780 A | 8/1996 | Krein | |
| 5,664,092 A | 9/1997 | Waites | |
| 5,727,172 A | 3/1998 | Eifert et al. | |
| 5,761,731 A | 6/1998 | Van Doren et al. | |
| 6,260,098 B1 | 7/2001 | Ku | |
| 6,377,581 B1 | 4/2002 | Anand et al. | |
| 6,381,663 B1 | 4/2002 | Morrison et al. | |
| 6,446,149 B1 | 9/2002 | Moriarty et al. | |
| 6,487,622 B1 | 11/2002 | Coskrey, IV et al. | |
| 6,490,642 B1 * | 12/2002 | Thekkath et al. .......... 710/110 |
| 6,529,933 B1 * | 3/2003 | Montgomery et al. ....... 718/102 |
| 2002/0038398 A1 | 3/2002 | Morrison et al. | |
| 2003/0163642 A1 * | 8/2003 | Borkenhagen et al. ....... 711/121 |
| 2004/0059563 A1 * | 3/2004 | Motyka et al. ................. 703/26 |

FOREIGN PATENT DOCUMENTS

WO    0197020 A1    12/2001

OTHER PUBLICATIONS

Microsoft Computer Dictionary; 2002; Fifth Edition; Definition of "Atomic Operation".*

* cited by examiner

*Primary Examiner* — Brian Peugh
*Assistant Examiner* — Prasith Thammavong

(57) ABSTRACT

A system and method for modifying an information unit, the method includes the following stages: (i) receiving, over a first bus, a request to initiate a snooping type atomic operation associated with at least one information unit located at a first address of a memory module; (ii) providing the information unit over the first bus; (iii) attempting to complete the snooping type atomic operation of an updated information unit; and (iv) defining the atomic operation as a failed atomic operation if during at least one stage of receiving, providing and attempting, the first address was locked as a result of a locking type atomic operation.

27 Claims, 6 Drawing Sheets

METHOD AND APPARATUS FOR MODIFYING AN INFORMATION UNIT USING AN ATOMIC OPERATION

FIELD OF THE INVENTION

The present invention relates to methods and apparatuses for modifying an information unit, using an atomic operation, especially within an environment that facilitates different types of atomic operations.

BACKGROUND OF THE INVENTION

A successful atomic operation includes an uninterrupted sequence of operations. An atomic operation is regarded as a failed atomic operation if the sequence was not completed. A typical atomic operation includes "read-modify-write" operations.

Many modern devices include multiple semiconductor components, such as microprocessors, direct memory access units, micro-controllers, and the like. In order to reduce the cost of these increasingly complex devices multiple components share the same system resources. The shared resources are typically memory banks, buses, peripherals and the like.

In order to avoid collisions, a shared resource can be controlled by only one master component at the time. Typical control schemes include determining an availability of a shared resource before attempting to control the slaved component. U.S. Pat. No. 6,446,149 of Moriarty, et al., titled "Self-modifying synchronization memory address space and protocol for communication between multiple bus masters of a computer system", which is incorporated herein by reference, describes a method for managing a shared resource.

The availability of a shared resource is usually represented by a semaphore. A semaphore is a flag or status indicator that can be accessed by various components. It usually resides at a predefined memory address, and its value reflects if the shared resource is available or not.

It is common practice to update a semaphore using a "read-modify-write" atomic operation. There are two common methods for updating a semaphore. The first method involves locking a memory module that stores the semaphore until the semaphore update procedure is completed. In some prior art systems the memory module and optionally one or more buses are locked during the semaphore update procedure. A locking type semaphore updating procedure usually includes: (i) locking the memory module and optionally locking one or more bus; (ii) reading, by the requesting component, the semaphore, (iii) determining, in response to the value of the semaphore, if the shared resource is available, (iv) if the semaphore value indicates that the shared resource is available—altering the semaphore to indicate that the shared resource is scheduled to be used by the requesting component, else—determining that the shared entity is not available, and (v) unlocking the memory and one or more bus that was previously locked. This method causes a significant degradation in the bus and memory performances.

A second method includes address snooping. In this method, the memory module and optionally one or more buses are not locked during the entire process. The requesting component does not prevent other components from accessing the memory module, but monitors that memory module to determine if the semaphore was modified between the read and expected modify stages. If such a modification occurred the atomic operation is flagged as a failed atomic operation and the requesting component can decide whether to repeat the atomic operation.

Snooping type atomic operation is more bandwidth effective than the locking type atomic operation but is more complex. U.S. Pat. No. 5,727,172 of Eiffert at el., titled "Method and apparatus for performing atomic accesses in a data processing system", which is incorporated herein by reference, describes an address snooping method. It requires snoop logic to support multiple bus masters.

Due to the complexity of many modern semiconductor components, and especially microprocessors, the design of most semiconductor devices is based upon previously developed components. In some cases various semiconductor components that share the resource apply different types of atomic operations.

U.S. Pat. No. 5,548,780 of Krein, titled "Method for semaphore communication between incompatible bus locking architectures", which is incorporated herein by reference, describes a multiple bus architecture that includes multiple bus-bridges for propagating atomic operations between different buses. The method requires that the semaphore has a certain predetermined value that shall indicate the availability of the shared resource.

U.S. Pat. No. 6,381,663 of Morrison et al., titled "Mechanism for implementing bus locking with a mixed architecture", which is incorporated herein by reference, describes an apparatus and method for bridging between a bus that supports atomic operations and another bus that does not support atomic operations. This solution is very costly in terms of performance.

There is a need to provide an apparatus and method that can efficiently handle different types of atomic transactions.

SUMMARY OF THE PRESENT INVENTION

A method for modifying an information unit, the method includes: (i) receiving, over a first bus, a request to initiate a snooping type atomic operation associated with at least one information unit located at a first address of a memory module; (ii) providing the information unit over the first bus; (iii) attempting to complete a snooping type atomic operation associated with an updated information unit; and (iv) defining the atomic operation as a failed atomic operation if during at least one stage of receiving, providing and attempting, the first address was locked as a result of a locking type atomic operation.

A method for modifying an information unit, the method includes: (i) receiving, over a first bus, a request to perform an atomic read operation of an information unit located at a first address of a memory module; (ii) providing the information unit over the first bus; and (iii) attempting to perform a snooping type atomic write operation of an updated information unit if during at least one stage out of receiving and providing the first address is not locked as a result of a locking type atomic operation.

A method for modifying an information unit, the method includes: (i) receiving, over a first bus, a request to perform a snooping type atomic read operation of an information unit located at a first address of a memory module; (ii) providing the information unit over the first bus; (iii) attempting to perform a snooping type atomic write operation of an updated information unit; and (iv) defining an atomic operation that includes the atomic write operation as a failed atomic operation if during at least one stage of receiving, providing and attempting, the first address was locked as a result of a locking type atomic operation.

The invention provides an apparatus for modifying an information unit, the apparatus includes: (i) a memory module, adapted to store an information unit at a first address; and (ii) a controller, connected to the first and second bus and to the memory module; the controller is adapted to: (a) receive, over a first bus, a request to perform an atomic read operation of the information unit; (b) facilitate a provision of the information unit over the first bus; and (c) facilitate an attempt to perform a snooping type atomic write operation of an updated information unit if during the stages of receiving and providing the first address is not locked as a result of a locking type atomic operation.

The invention provides an apparatus for modifying an information unit, the apparatus includes a first requesting component, such as but not limited to a processor, a controller and the like, adapted to send, over a first bus, a request to perform an atomic read operation of an information unit located at a first address of a memory module; a controller, configured to facilitate a provision of the information unit over the first bus; whereas the first requesting component is further adapted to attempt to perform a snooping type atomic write operation of an updated information unit if during at least one stage out of receiving and providing the first address is not locked as a result of a locking type atomic operation.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

The following detailed description includes non-limiting example of various embodiments of the invention. The particular terms and expressions employed and the particular structural and operational details disclosed in the detailed description and accompanying drawings are for illustrative purposes only and are not intended to in any way limit the scope of the invention as described in the appended claims.

The method and system solve the problems associated with utilizing a predefined semaphore value.

Figure 1:
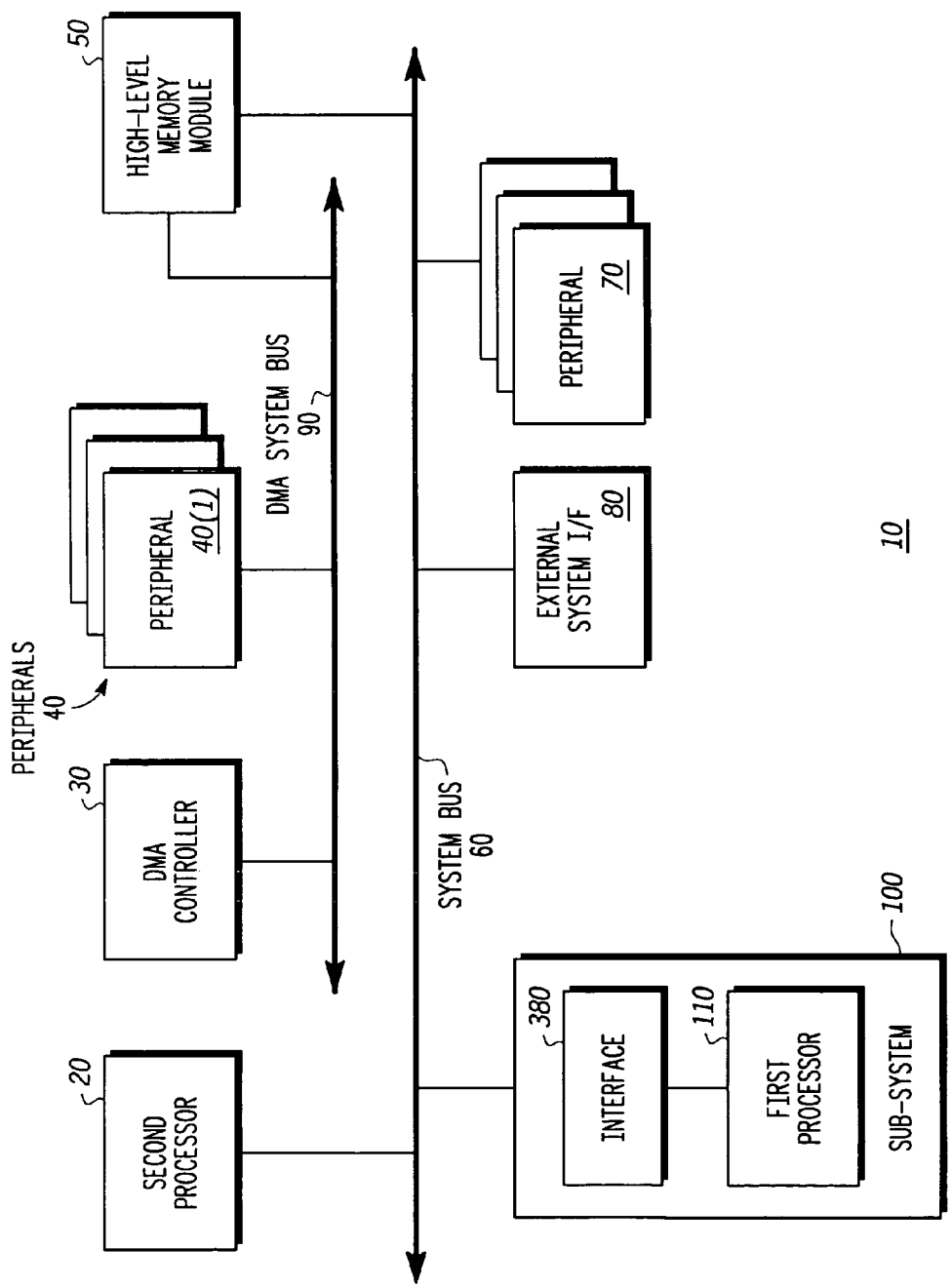
FIG. 1 is a schematic illustration of an apparatus, that includes two processors and a shared memory module, according to an embodiment of the invention.

FIG. 1 illustrates an apparatus 10 according to an embodiment of the invention. Apparatus 10 includes a sub-system 100 that in turn includes a first requesting component such as first processor 110 and also includes a shared memory module (denoted 370 in FIG. 2). Apparatus 10 further includes a system bus 60 that is connected to: (i) a second requesting entity such as second processor 20, (ii) high-level memory module 50, (iii) sub-system 100, (iv) peripherals 70, and (v) an external system I/F 80.

The high-level memory module 50 is usually a main memory module of apparatus 10. It usually stores programs and data for the various processors. It can also be a second level cache memory module supporting off-chip memories, but this is not necessarily so.

System bus 60 is connected to sub-system 100, via a gasket (also referred to as interface) 380. Interface 380 is connected to various components within sub-system 100 including a data channel (denoted 130 in FIG. 2) and an instruction channel (denoted 340 in FIG. 2). The interface 380 performs bus protocol translations and has arbitrating capabilities for arbitrating between data transfers and instruction transfers.

Apparatus 10 also includes a DMA system bus 90 that is connected to a DMA controller 30, to multiple peripherals 40 and to the shared memory module 370, via DMA interface 382. The DMA system bus 90 can be used by external components, such as processor 20 to access the shared memory module 370.

On one hand, shared memory module 370 is connected to DMA system bus 90 that is adapted to facilitate locking type atomic operations. On the other hand, shared memory module 370 is connected to two data buses XA 122 and XB 124 that facilitate snooping type atomic operations.

Figure 2:
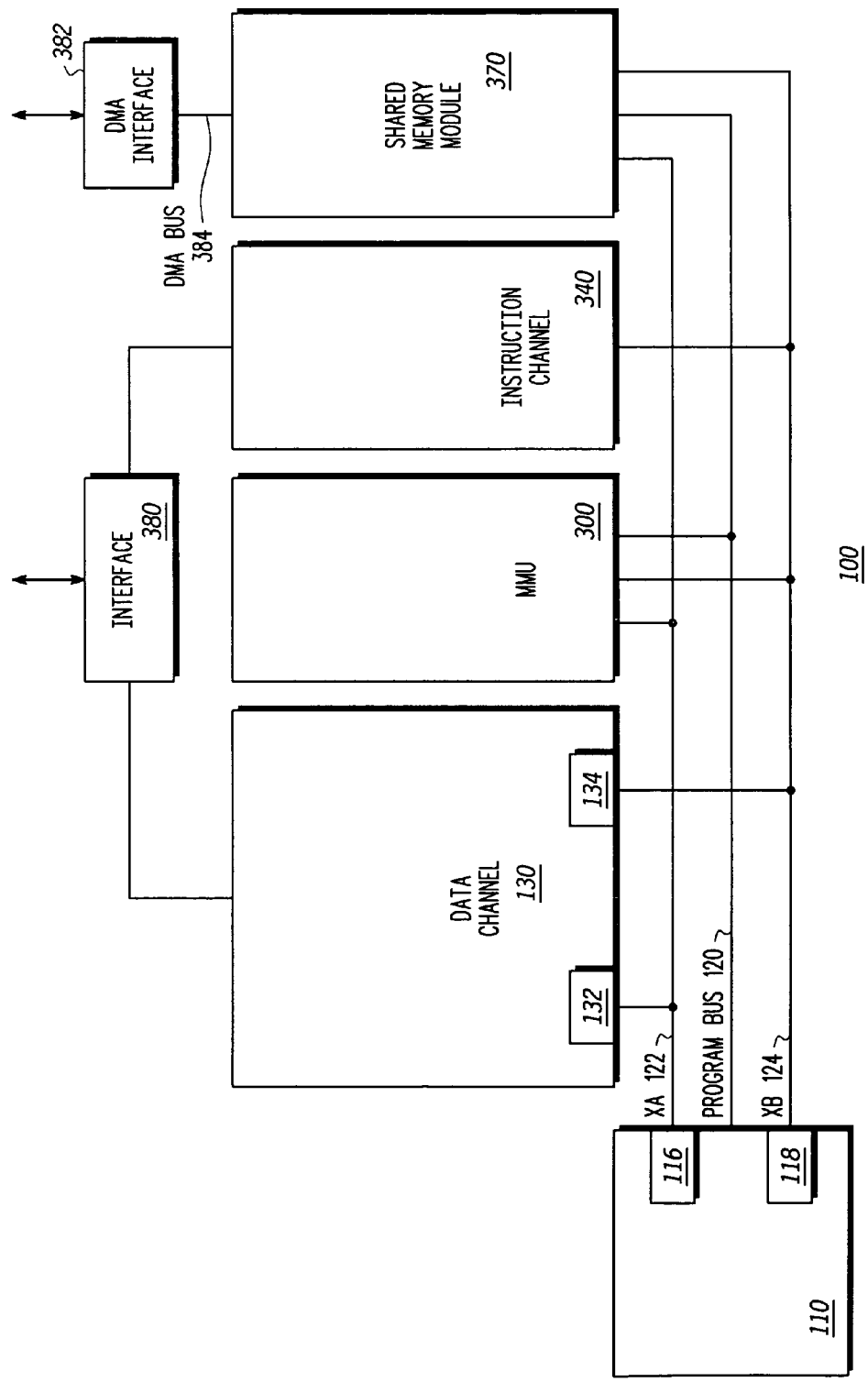
FIG. 2 is a schematic illustration of a sub-system that includes the shared memory module and a first processor.

FIG. 2 illustrates a sub-system 100 of apparatus 10, according to an embodiment of the invention. Sub-system 100 includes a processor 110, a data channel 130, a Memory Management Unit (MMU) 300, an instruction channel 340, a shared memory module 370 and an interface unit 380. The shared memory module 370 can be a level-one RAM memory module but this is not necessarily so.

Processor 110 and the instruction channel 340 are connected to a single program bus 120.

Processor 110 has a first data port 116 and a second data port 118. The first data port 116 is connected, via a first data bus (XA) 122 to a first port 132 of the data channel 130, to the MMU 300 and to the shared memory module 370. The second data port 118 is connected, via a second data bus (XB) 124 to a second port 134 of the data channel 130, to the MMU 300 and to the shared memory module 370.

The data channel 130 is connected via a data fetch bus 126 to an interface 380 that in turn is connected to one or more additional memories such as high-level memory module 50.

The shared memory module 370 is conveniently partitioned to two groups of memory banks, each including multiple memory banks and a controller.

Figure 3:
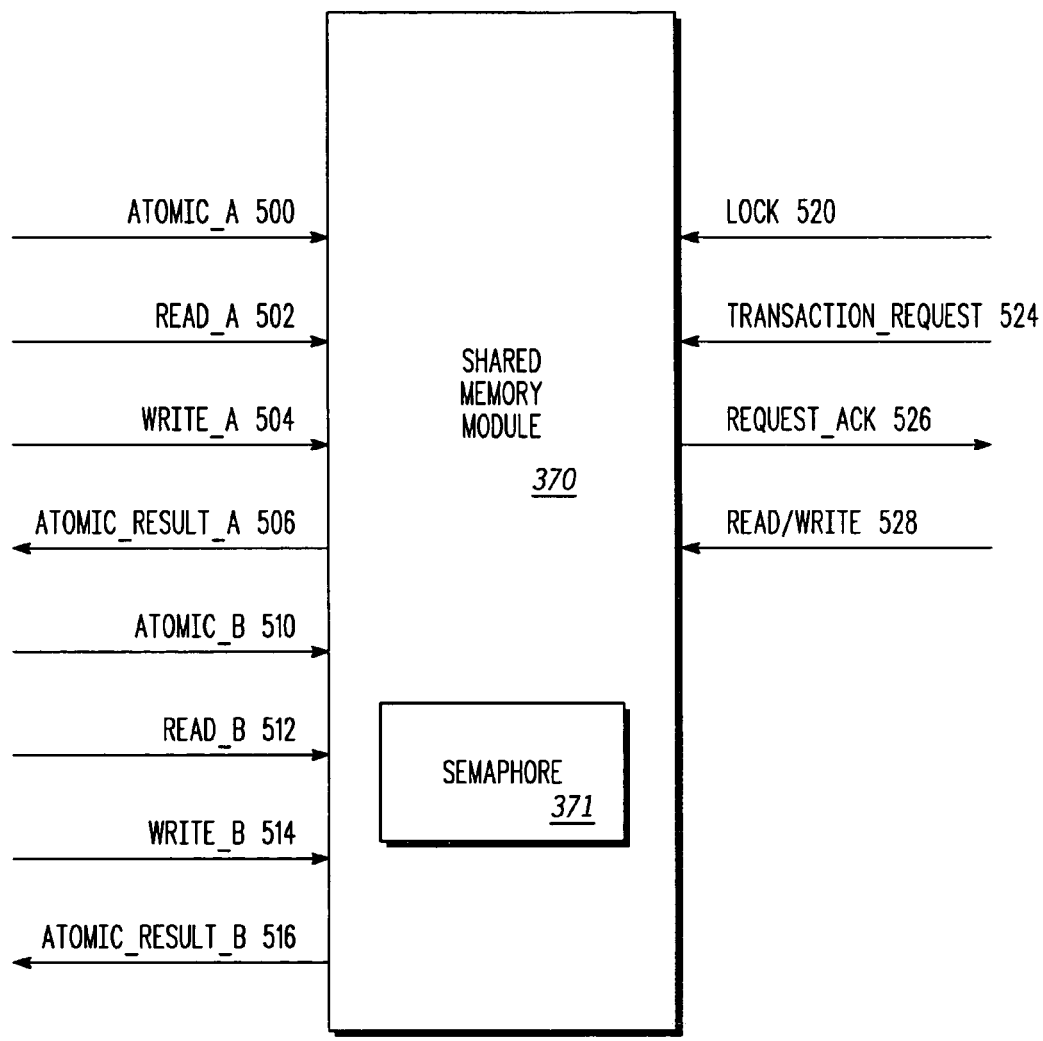
FIG. 3 is a schematic illustration of various signals that are exchanged during atomic operations, according to an embodiment of the invention.

The shared memory module 370 receives various control signals that include status information and especially information relating to atomic operations. Some of these signals are illustrated in FIG. 3.

Processor 110 sends three control signals, associated with the first data bus XA 122, to the shared memory module 370. These signals are ATOMIC_A signal 500, READ_A signal 502 and WRITE_A signal 504. Processor 110 receives an ATOMIC_RESULT_A signal 506 from shared memory module 370 that indicates if the snooping type atomic operation, initiated by processor 110 over the first data bus XA 122, failed or succeeded. It is assumed that processor 110 asserts the ATOMIC_A signal 500 once it initiates an atomic operation over first data bus XA 122 and negates this signals once the atomic operation ends. Processor 110 asserts the READ_A signal 502 during a read operation over the first data bus XA 122 and asserts the WRITE_A signal 504 during a write operation over the first data bus XA 122.

Processor 110 sends three control signals, associated with the second data bus XB 124, to the shared memory module 370. These signals are ATOMIC_B signal 510, READ_B signal 512 and WRITE_B signal 514. Processor 110 receives an ATOMIC_RESULT_B signal 516 from shared memory module 370 that indicates if the snooping type atomic operation, initiated by processor 110 over the second data bus XB 124, failed or succeeded. It is assumed that processor 110 asserts the ATOMIC_B signal 500 once it initiates an atomic operation over second data bus XB 124 and negates this signals once the atomic operation ends. Processor 110 asserts the READ_B signal 512 during a read operation over the second data bus XB 124 and asserts the WRITE_B signal 514 during a write operation over the second data bus XB 124.

Processor 20 sends to the shared memory module 370 a LOCK signal 520, a READ/WRITE signal 522 and a TRANSACTION_REQUEST signal 524. It receives from the shared memory module 370 a REQUEST_ACK signal 526. Processor 20 asserts the TRANSACTION_REQUEST signal 524 to request a transaction (such as a read or write operation) over DMA bus 384, and a transaction occurs in response of an asserted REQUEST_ACK signal 526. The LOCK signal 520 is asserted during the whole locking type atomic operation, and the READ/WRITE signal 522 is asserted to indicate an read operation and negated to indicate a write operation.

Shared memory module 370 stores a semaphore 371 that may indicate if a certain peripheral, such as peripheral 40(1) can be controlled by either processor 20 or processor 110. Usually, the shared memory module 370 stores multiple semaphores, reflecting the availability of multiple peripherals, but only a single semaphore is illustrated for simplicity of explanation.

Figure 4:
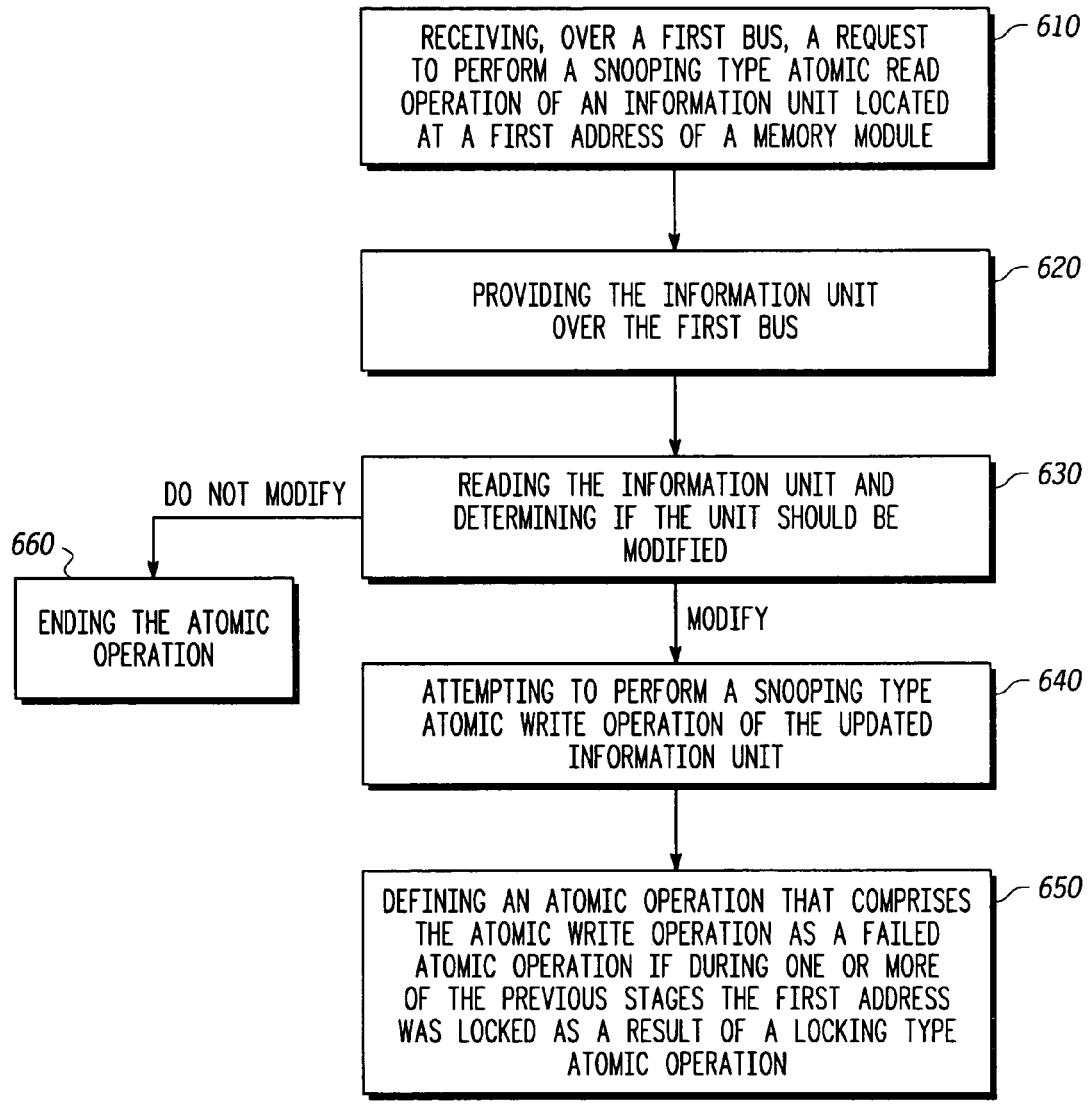
FIG. 4 is a flow chart illustrating a method for modifying an information unit, according to an embodiment of the invention.

FIG. 4 is a flow chart illustrating method 600 for modifying an information unit, according to an embodiment of the invention. The information unit may include multiple signals that represent data, address, status and the like. Conveniently, the information unit is a semaphore.

Method 600 starts by stage 610 of receiving, over a first bus, a request to initiate a snooping type atomic operation associated with at least one information unit located at a first address of a memory module. The request is conveniently a request to start a snooping type atomic read operation. Referring to the example set forth in FIG. 3, and assuming that the snooping type atomic operation is associated with the first data bus XA 122 then processor 110 asserts ATOMIC_A signal 500 and asserts the READ_A signal 502.

According to an embodiment of the invention processor 110 can also initiate a snooping type atomic operation that is associated with the second data but XB 124, and each of the shared memory 370 controllers can arbitrate between these requests. According to another embodiment of the invention processor 110 is capable of initiating one atomic operation (either over bus XA 122 or over bus XB 124) at a time and such arbitration is not required.

Stage 610 is followed by stage 620 of providing the information unit over the first bus. Referring to the example set forth in FIG. 3, and further assuming that the information unit is located within a first group of memory banks, the first group controller allows the requested data unit to be sent over the first data bus XA 122 to processor 110.

Stage 620 is followed by a stage 630 of reading the information unit and determining if the information unit should be modified to provide a modified information unit. If the answer is positive stage 630 is followed by stage 640, and if the answer is negative stage 630 is followed by stage 660 of ending the atomic transaction. Referring to the example set forth in FIG. 3, it is assumed that the information unit is a semaphore 371 reflecting an availability of peripheral 40(1). If the semaphore 371 indicates that peripheral 40(1) is not available then processor 110 can decide not to update semaphore 371 and terminate the atomic operation. If the semaphore 371 indicates that peripheral 40(1) is available then processor 110 can try to update semaphore 371 to indicate that processor 110 is about to control peripheral 40(1).

Stage 640 includes attempting to complete the snooping type atomic operation. The completion may include an atomic write operation of previously modified information unit. Referring to the example set forth in FIG. 3, processor 110 sends an updated semaphore 371 over the first data bus XA 122, if it decides that such an update is appropriate.

Stage 650 includes defining the snooping type atomic operation as a failed atomic operation if during at least one stage of receiving, providing and attempting, the first address was locked as a result of a locking type atomic operation. Referring to the example set forth in FIG. 3, if during one or more stage out of stages 620-640 the shared memory module 370 participates in a locking type atomic operation associated with semaphore 371, the snooping type atomic operation initiated by processor 110 ends.

Processor 110 may attempt to execute snooping type atomic operations until it succeeds to control peripheral 40(1), but this is not necessarily so. For example, processor 110 may repeat this session for a predefined amount of iterations.

Figure 5:
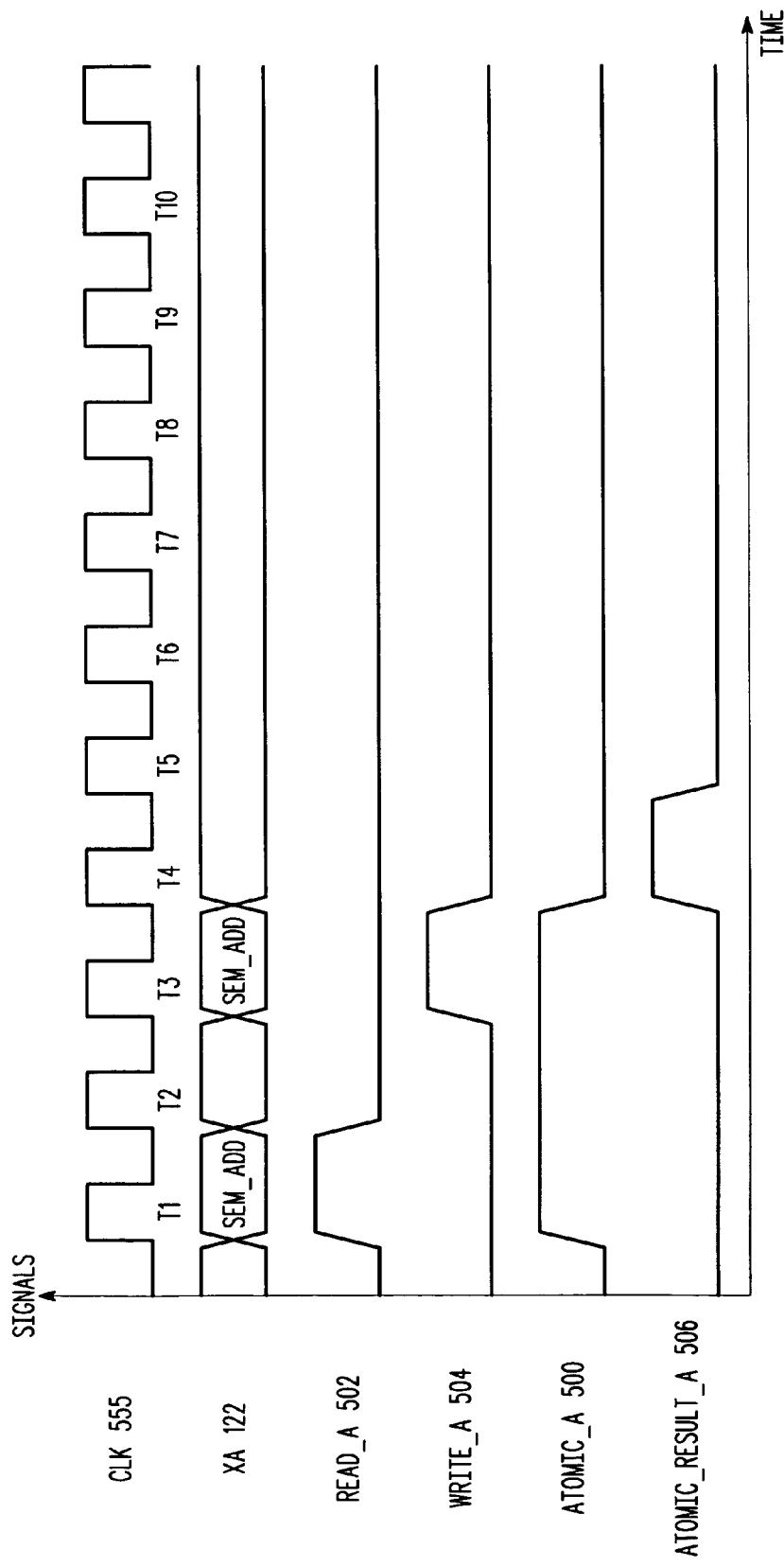
FIG. 5 is a timing diagram of a successful snooping type atomic operation, according to an embodiment of the invention.

FIG. 5 is a timing diagram of a successful snooping type atomic operation, according to an embodiment of the invention. The timing diagram illustrates a clock signal CLK 555, a 24-bit address bus 524 associated with the first data bus XA 122, READ_A signal 502, WRITE_A signal 504, ATOMIC_A signal 500 and ATOMIC_RESULT_A signal 506.

At a first cycle of the clock (T1) processor 110 sends a 24-bit address (SEM_ADD) of semaphore 371 over the first data bus XA 122 and asserts the READ_A signal 502 as well as the ATOMIC_A signal 500. The READ_A is negated after a clock cycle.

It is assumed that at the second clock cycle (T2) the semaphore 371 is sent to processor 110 over the first data bus XA 122.

During the next clock cycle (T3), processor 110 updates the semaphore 371 and is ready to try to write the updated semaphore to the shared memory module 370.

At the next clock cycle (T4) processor 110 asserts the WRITE_A signal 504 and also sends the 24-bit address of the semaphore 371 over the first data bus XA 122.

At the next clock cycle (T5) the processor negates the WRITE_A signal 504 as well as the ATOMIC_A signal 500. Assuming that processor 110 succeeds in writing the modified semaphore 371 then the first group processor 374 asserts the ATOMIC_RESULT_A signal 506.

Figure 6:
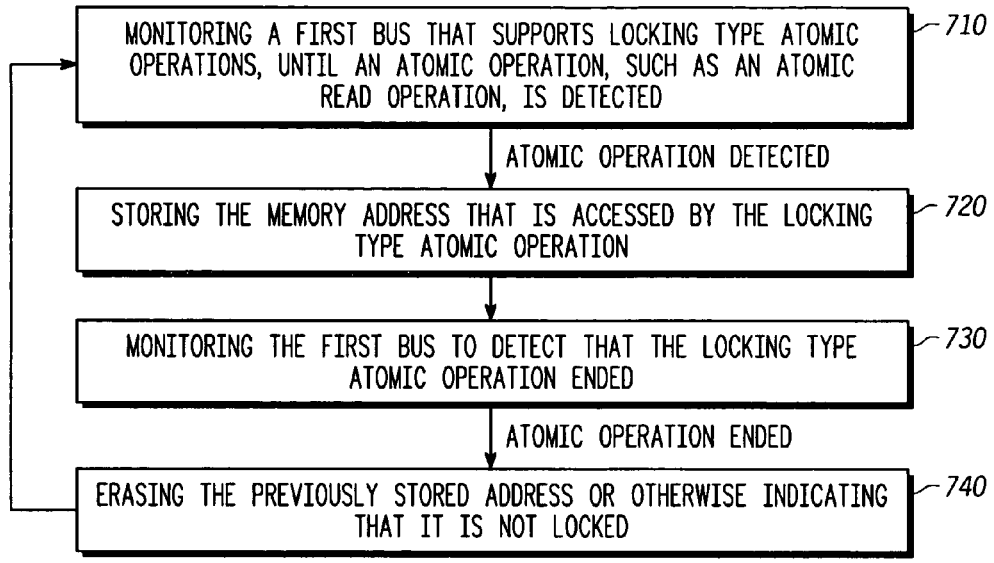
FIGS. 6-7 are flow charts of two processes that are executed by a controller, according to an embodiment of the invention.
Figure 7:
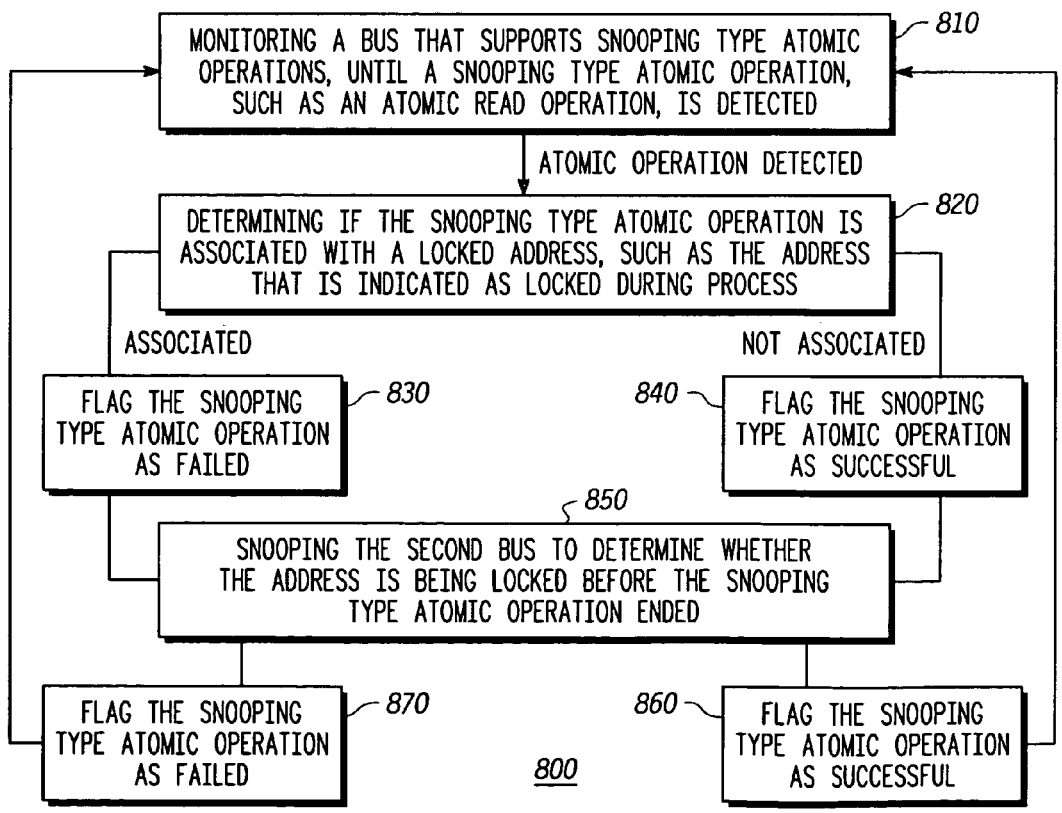

FIG. 6 illustrates a first process 700 that is executed by a controller and FIG. 9 illustrates another process 800 that is also executed by a controller, such as but not limited to the first group processor 374, according to an embodiment of the invention.

The first process 700 involves monitoring a locking type atomic operation supporting bus such as but not limited to DMA bus 374, while the other process 800 involves monitoring a snooping type operation atomic operation supporting bus, such as first and second data buses XA 122 and XB 124. For simplicity of explanation only the monitoring of the first data bus XA 122 is illustrated. The outcome of process 800 depends upon the outcome of process 700.

Process 700 starts by stage 710 of monitoring a first bus that supports locking type atomic operations, until an atomic operation, such as an atomic read operation, is detected. The monitoring may include receiving and checking various control signals, such as LOCK signal 520, but this is not necessarily so.

Once such as atomic operation is detected stage 710 is followed by stage 720 of storing the memory address that is accessed by the atomic operation. This address is locked during the locking type atomic operation.

Stage 720 is followed by stage of 730 of monitoring the first bus to detect that the atomic operation ended (for example an atomic write operation that ends the atomic operation has ended). Once it ended stage 730 is followed by stage 740 of erasing the previously stored address or otherwise indicating that it is not locked. Stage 740 is followed by stage 710.

Process 800 starts by stage 810 of monitoring a second bus that supports snooping type atomic operations, until an atomic operation, such as an atomic read operation, is detected. Such an operation can be detected by monitoring various control signals, such as ATOMIC_A signal 500, but this is not necessarily so.

Once such an atomic operation is detected stage 810 is followed by stage 820 of determining whether the atomic operation is associated with a locked address. This locked address is usually the address that is being locked by process 700.

If the address is locked the atomic operation is flagged as failed, during stage 830. The failed atomic operation can end, but usually the process proceeds to stage 850 even if the atomic operation failed.

If the address is not locked the atomic operation is flagged as a successful atomic operation during stage 840.

Stage 840 is followed by stage 850 of snooping the second bud to determine whether the address is being locked before the snooping type atomic operation ended. If the answer is positive then the atomic operation is flagged as failed during stage 860, else it is followed by stage 870 of flagging the atomic operation as a successful atomic operation. It is noted that if the operation was flagged as failed during stage 830 it will not be flagged as a successful atomic operation during stage 870. Stages 870 and stage 860 are followed by stage 810.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:

1. A method for modifying an information unit, using an atomic operation, the method comprising the stages of:
   receiving, over a first bus, a request, from a first requesting component to initiate a snooping type atomic operation associated with an information unit located at a first address of a memory module, the information unit comprising a semaphore and the snooping type atomic operation comprising monitoring the memory module to determine if the information unit was modified and not preventing other components from accessing the memory module;
   providing the information unit over the first bus to the first requesting component;
   reading the information unit and determining if the information unit should be modified to an updated information unit, and if the answer is positive:
      attempting to complete the snooping type atomic operation that is associated with the updated information unit, wherein the attempt to complete includes an atomic write operation of the updated information unit; and
   defining the snooping type atomic operation as a failed atomic operation if during the receiving, providing, reading, and attempting, the first address was moved from an unlocked state to a locked state as a result of a locking type atomic operation over the first bus, the locking type atomic operation comprising an operation locking the memory module that stores the information unit until the information unit is updated.

2. The method of claim 1 wherein the stage of receiving comprises receiving a request to perform a snooping type atomic read operation.

3. The method of claim 1 whereas the stage of attempting to complete comprises attempting to perform a snooping type atomic write operation of the updated information unit.

4. The method of claim 1 wherein a request to initiate the locking type atomic operation is provided via a second bus.

5. The method of claim 1 wherein the stage of attempting comprises providing the updated information unit over the first bus.

6. The method of claim 1 further comprising repeating the receiving, providing and attempting stages until completing a successful snooping type atomic operation.

7. The method of claim 1 wherein the locking type atomic operation is a locking type atomic read operation.

8. The method of claim 1 wherein the locking type atomic operation is a locking type atomic write operation.

9. The method of claim 1 further comprising a stage of receiving another request to initiate a snooping type atomic operation of the information unit located at the first address and arbitrating between the snooping type atomic operations.

10. A method for modifying an information unit, the method comprising the stages of:
    receiving, over a first bus, a request from a first requesting component, to perform an atomic read operation of an information unit located at a first address of a memory module;
    providing the information unit over the first bus;
    updating the information unit by the first requesting component to provide an updated information unit;
    attempting, by the first requesting component, to perform a snooping type atomic write operation of the updated information unit in response to determining, prior to initiating the snooping type atomic write operation, that the first address is not locked as a result of a locking type atomic operation; and
    indicating a failure of the snooping type atomic write operation in response to determining the first address was moved from an unlocked state to a locked state during the snooping type atomic write operation.

11. The method of claim 10 wherein a request to initiate the locking type atomic operation is provided via a second bus.

12. The method of claim 10 wherein the information unit comprises a semaphore.

13. The method of claim 10 wherein the stage of attempting comprises providing an updated information unit over the first bus.

14. The method of claim 10 further comprising repeating the stage of receiving, providing and attempting until completing a successful snooping type atomic operation.

15. The method of claim 10 wherein the locking type atomic operation is a locking type atomic read operation.

16. The method of claim 10 further comprising a stage of receiving another request to perform a snooping type atomic read operation of the information unit located at the first address and arbitrating between the snooping type atomic read operations.

17. An apparatus for modifying an information unit, using an atomic operation, the apparatus comprises:
   a memory module, adapted to store an information unit at a first address;
   a controller, coupled to a first bus and to the memory module; the controller is adapted to receive a request to initiate a snooping type atomic operation associated with an information unit located at a first address of a memory module; to provide the information unit over the first bus; to receive a modified information unit; to define the snooping type atomic operation as a failed atomic operation in response to determining, prior to initiating the snooping type atomic operation, that the first address is locked;
   to attempt to complete the snooping type atomic operation of the updated information unit; and to define the atomic operation as a failed atomic operation if during the snooping type atomic operation, the first address was moved from an unlocked state to a locked state as a result of a locking type atomic operation.

18. The apparatus of claim 17 wherein a request to initiate the locking type atomic operation is provided via a second bus.

19. The apparatus of claim 17 wherein the information unit comprises a semaphore.

20. The apparatus of claim 17 wherein the controller is further adapted to send a failed atomic operation over the first bus.

21. The apparatus of claim 17 wherein the locking type atomic operation is a locking type atomic read operation.

22. The apparatus of claim 17 further comprising a first processor, coupled to the first bus and a second processor coupled to the second bus.

23. An apparatus for modifying an information unit, the apparatus comprising:
   a first requesting component, adapted to send, over a first bus, a request to perform an atomic read operation of an information unit located at a first address of a memory module, and to updating the information unit to provide an updated information unit;
   a controller, configured to facilitate a provision of the information unit over the first bus; and
   whereas the first requesting component is further adapted to attempt to perform a snooping type atomic write operation of the updated information unit in response to determining, during at least one of requesting and providing, that the first address is not locked as a result of a locking type atomic operation and wherein the controller is to indicate a failure of the snooping type atomic write operation in response to determining the first address was moved from an unlocked state to a locked state during the snooping type atomic write operation.

24. The apparatus of claim 23 wherein the controller is further adapted to indicate the failure over the first bus.

25. The apparatus of claim 23 wherein the locking type atomic operation is a locking type atomic read operation.

26. The apparatus of claim 23 further comprising a second requesting component adapted to initiate the locking type atomic operation.

27. The apparatus of claim 23 wherein the first requesting component is a processor.

* * * * *